Patented Jan. 30, 1934

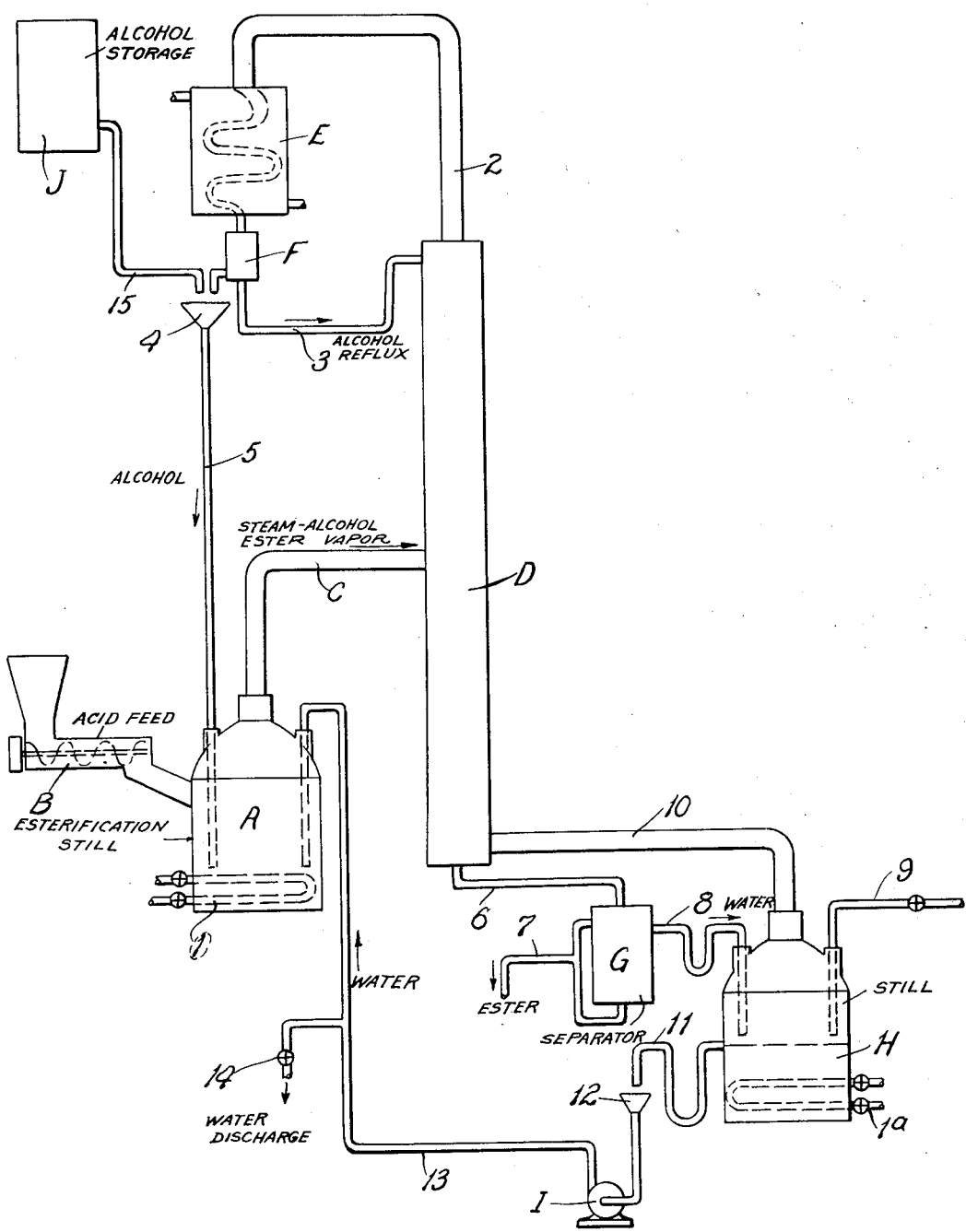

1,945,177

UNITED STATES PATENT OFFICE 1,945,177

CONTINUOUS PROCESS FOR PRODUCING ESTERS

Thomas S. Carswell, Kirkwood, and Ernest T. Stehlby and Nicolaas J. G. Alozerij, St. Louis, Mo., assignors, by mesne assignments, to Monsanto Chemical Company, a corporation of Delaware Application September 17, 1928
Serial No. 306,505

10 Claims. (Cl. 260—104)

This invention relates to the production of esters.

The main object of our invention is to provide a commercially feasible, continuous process for producing esters from alcohols that boil below 100° C. and acids which are practically non-volatile below 120° C.

Another object of our invention is to provide a practicable apparatus for practising our process.

Briefly described, our process consists in boiling a mixture containing alcohol, acid, ester and water, adding steam or water to the boiling mixture, preferably continuously, so as to produce sufficient vapor to cause the ester formed by the reaction to be continuously removed from the mixture and thereby cause the equilibrium of the mixture to be displaced in such a way that the alcohol and acid present will produce more ester, adding to the boiling mixture such amounts of acid and alcohol as are chemically equivalent to the ester removed from the mixture, and subjecting the vapors evolved in the boiling operation to such treatment as to recover the ester contained in the same. The vapors evolved in the boiling operation contain alcohol and water in addition to the ester produced by the reaction, and in certain cases, small amounts of the acid which is being esterified. We prefer to recover said alcohol and return it to the boiling mixture and utilize said water as the source of supply of water or steam which is added to the boiling mixture to effect the removal of the ester, and consequently, displace the equilibrium of the boiling mixture, thereby producing a continuous process for producing esters that will give a sufficiently high yield of ester to make the process commercially feasible.

The mixture of alcohol, ester, acid and water used to start the operation may be prepared in any suitable manner, for example, by mixing the said materials together in the proper proportion, or it may be prepared by mixing the alcohol and acid together in suitable proportions and heating them, with the removal of such an amount of alcohol and water as is necessary, until the desired mixture of alcohol, acid, ester and water has been produced by esterification. Or, as an alternative procedure, ester alone may be charged to the apparatus, and the other components added in the continuous manner hereinafter described. Whatever procedure is used to produce the mixture, it is essential that said mixture have a relatively high boiling point, usually over 110° C. to 120° C.

Various types and kinds of apparatus may be used to practise our process, but we prefer to use an apparatus that comprises a boiling chamber provided with a vapor discharge pipe that leads to a fractionating column which is so regulated that the alcohol which is carried over in the vapors that escape from the boiling chamber will be delivered from the top of the fractionating column to a condenser, wherein said alcohol vapors are converted into alcohol which is subsequently returned to the boiling mixture. The liquid which runs from the bottom of the fractionating column, and which consists of a mixture of water and ester, is introduced into any suitable kind of a separating device that will effect the separation of the water from the ester. The apparatus herein illustrated is equipped with a second boiling chamber, wherein the water separated from the ester is subjected to a boiling operation so as to supply steam through the vapor outlet from this second boiling chamber to the base of the fractionating column, for the purpose of stripping all the alcohol from the liquid which flows down the lower part of the fractionating column. The water which collects in this second boiling chamber is withdrawn from the same, preferably continuously, and said water, minus a portion which is chemically equivalent to the ester which has been removed from the boiling mixture, is returned to said boiling mixture, so as to constitute the source of supply of water that is relied upon to continuously remove the ester from the mixture as said ester is formed. Any suitable means can be used to add fresh acid and fresh alcohol to the boiling mixture, so long as said ingredients are fed into the boiling mixture preferably continuously and in quantities equivalent to the ester produced by the reaction and continuously removed from the boiling mixture.

Instead of subjecting the water separated from the ester to a second boiling operation, and introducing the vapors evolved in this operation into the base of the fractionating column, live steam obtained from any source may be introduced into the base of the fractionating column, and the water separated from the ester may be returned directly to the chamber in which the mixture is being boiled, it being necessary, however, to discard a quantity of said water equivalent to the amount of water formed in the production of ester, plus an amount of water equal to the steam which is fed into the base of the fractionating column.

The figure of the drawing is a diagrammatic view, illustrating an apparatus that can be used to practise our process.

Said apparatus preferably comprises a boiling chamber A that constitutes the reaction chamber of the apparatus in which the esterification is carried out and which is adapted to receive a mixture of alcohol, acid, ester and water. If desired, a suitable catalyst, such as sulphuric acid, may be added to the mixture in the chamber A to increase the velocity of the reaction. The boiling chamber A is equipped with any suitable kind of heating means, such, for example, as a coil 1, and a feeding device designated as an entirety by the reference character B, is provided for introducing into the chamber A the acid which is to be esterified. A vapor outlet C leads from the upper end of the boiling chamber A into a fractionating column D, which may be of any conventional type, such as a fractionating column equipped with bubbling plates or screens, or a fractionating column packed with rings. The vapors ascending through the fractionating column D pass through the vapor outlet 2 at the upper end of said column into a condenser E, and the condensed liquor escapes from said condenser into a split flow box F, which is constructed so as to cause a portion of said liquor to be returned to the fractionating column D through a trapped line 3, and the remainder of said liquor to enter a funnel 4 at the upper end of a return pipe 5 which leads to the boiling chamber A. It is obvious that the fractionating column may be equipped with any customary or suitable form of dephlegmator. The run-off that escapes from the lower end of the fractionating column D and which consists of ester and water, passes through a line 6 into any suitable kind of separating device G, preferably a separating device that will cause the ester to be automatically separated from the aqueous solution by its difference in specific gravity. The separated ester runs off from the separator through a discharge line 7, and the water separated from the ester escapes from the separating device through a trapped discharge pipe 8.

We prefer to subject the water separated from the ester to a second boiling operation, so as to supply steam to the base of the fractionating column, in order that all the alcohol may be removed (by the well-known principles of continuous fractionation) from the liquid which flows down the lower part of the fractionating column, and to this end we have equipped the apparatus with a second boiling chamber H, heated by a coil 1ᵃ or any other suitable means, and arranged so that the water discharge pipe 8 from the separating device G enters the upper end of said boiling chamber H. The boiling chamber H is equipped with a water supply pipe 9 that leads from any suitable source of water supply, and a vapor outlet 10 leads from the upper end of said boiling chamber H to the base of the fractionating column D. As liquid accumulates in the boiling chamber H, the excess is removed from said chamber, preferably continuously, by a constant level discharge device 11 and fed into a funnel 12 on the inlet pipe of a pump I, whose discharge line 13 leads to the boiling chamber A in which the esterification is carried out, thereby causing water to be added continuously to the boiling mixture in the reaction chamber A. As shown in the drawing, the discharge pipe 13 of the pump I is equipped with a draw-off valve 14, which is so regulated that it will permit an amount of water to escape from the pipe 13 that is equivalent to the amount of water formed in the production of the ester which escapes simultaneously from the separating device G through the discharge pipe 7. Any suitable means can be used for continuously feeding alcohol into the reaction chamber A, the means herein illustrated consisting of an alcohol storage tank J provided with an outlet pipe 15 that discharges alcohol into the funnel 4 at the upper end of the return pipe 5 which leads to the reaction chamber.

In the event it is not necessary or not desired to subject the water separated from the ester to a boiling operation, the second boiling chamber H is omitted and the water discharge pipe 8 of the separating device G is directly connected to the intake of the pump, the vapor pipe 10 that leads to the base of the fractionating column D being connected with any suitable source of supply of live steam. When the apparatus is constructed in this way the draw-off valve 14 in the discharge pipe 13 of the pump I is so regulated that a quantity of water will be permitted to escape from said discharge pipe 13 that is equal to the amount of water formed in the production of ester, plus an amount of water equal to the steam which has been fed to the base of the fractionating column D through the vapor pipe 10. Another slight change that can be made in the apparatus is to design it so that the acid to be esterified, the fresh alcohol from the supply tank J, the recovered alcohol that is fed into the return pipe 5 from the split flow device F and the water that is returned to the reaction chamber A through the discharge pipe 13 of the pump I, can be mixed together in a suitable mixing tank and fed into the boiling chamber A in the form of a solution or suspension. In certain cases, it is desirable to design the apparatus so that the recovered alcohol from the top of the column, the fresh alcohol from the supply tank J, or either one of them and the fresh acid to be esterified are mixed together, and the resulting solution fed into the boiling chamber A. In case either of these changes is made, it is obvious that the position of the feeding device designated by the reference character B, will be changed so as to feed the acid into the proper place.

In using our process in the preparation of methyl salicylate the following procedure may be employed:

A mixture consisting of approximately 900 lbs. of salicylic acid, approximately 438 lbs. of methanol and approximately 50 lbs. of a catalyst such as sulphuric acid is introduced into the reaction chamber A. The mixture is heated to boiling until the desired degree of esterification has been reached, and alcohol and water are then distilled off until the mixture boils at a temperature of 110° C. to 120° C. The vapors which rise from the reaction chamber A through the vapor outlet C pass into the fractionating column D and the more volatile vapors rise to the top of said column and are condensed in the condenser E, thereby producing alcohol which is discharged into the split flow device F. A portion of this alcohol or condensate is returned to the fractionating column D, through the trapped discharge line 3, and the remainder of said alcohol is conducted back to the boiling mixture in the reaction chamber A through the return pipe 5. The split flow device F is so regulated that very little methyl salicylate is present in the liquid which is discharged into the return pipe 5, but it is not necessary to regulate it so as to obtain pure methanol. The reflux in the fractionating column D drains from the discharge lines 6 at the lower end of said column into the separating device G, which is so adjusted as to deliver the methyl salicylate through the ester discharge pipe 7 while the aqueous portion of the reflux is delivered through the trapped water discharge pipe 8 that leads from the separating device G to the second boiling chamber H.

When the reaction is started sufficient water is fed into the second boiling chamber H through the water supply pipe 9 to fill said chamber up to the outlet of the constant level water outlet device 11, and in addition to fill the pump I and the discharge pipe 13 of said pump. The water in the boiling chamber H is kept boiling by means of the steam coil 1ª, and the rate of boiling is adjusted so that practically all of the methanol is stripped from the vapors in the lower part of the fractionating column D. The pump I is regulated so as to return water to the reaction chamber A at the rate of approximately 300 lbs. per hour. Under these conditions approximately 100 lbs. per hour of methyl salicylate will be delivered from the automatic separating device G through the discharge pipe 7 of said device. The draw-off valve 14 in the discharge pipe 13 of the pump I is regulated so as to permit approximately 11.8 lbs. of water to escape from said pipe per hour, which amount of water is chemically equivalent to the ester which has been removed. During the operation of boiling the mixture in the reaction chamber A, salicylic acid is fed into said boiling mixture at the rate of approximately 91 lbs. of acid per hour, and simultaneously with the operation of adding the salicylic acid to the boiling mixture methanol from the supply tank J is fed into said mixture at the rate of 21 lbs. of methanol per hour, which amounts of acid and alcohol are chemically equivalent to the ester that is discharged from the separating device G.

Another procedure that may be used for the preparation of methyl salicylate is as follows:

A mixture consisting of approximately 400 lbs. of salicylic acid, 400 lbs. of methyl salicylate, 50 lbs. of methanol, 20 lbs. of water, and 50 lbs. of a catalyst such as sulfuric acid, is introduced into the reaction chamber A. The mixture is heated, and when the temperature reaches a suitable point, say 120°, water is fed into the second boiling chamber H through the water supply pipe 9 until the chamber H is filled up to the outlet of the constant level water outlet device 11, and in addition,—until the pump I and the discharge pipe 13 of the pump are filled with water. The water in the boiling chamber H is then heated to boiling, and the pump I is put into operation so as to feed water to the reaction chamber A at the rate of 300 lbs. per hour. At the same time, the feed of salicylic acid is started and adjusted to feed into the reaction chamber A at the rate of approximately 90 lbs. per hour, and simultaneously with the operation of adding the salicylic acid to the boiling mixture, methanol from the supply tank J is fed into the boiling mixture at the rate of 21 lbs. of methanol per hour. Under these conditions, approximately 100 lbs. per hour of methyl salicylate will be delivered from the automatic separating device G through the discharge pipe 7. The draw-off valve 14 in the discharge pipe of pump I is regulated so as to permit approximately 11.8 lbs. of water to escape per hour.

Having thus described our invention, what we claim as new and desire to secure by Letters Patent is:

1. A process for producing esters of the class described, characterized by boiling a mixture containing: an organic carboxylic acid which is substantially non-volatile below 120° C., an aliphatic alcohol whose boiling point is below 100° C., water, and the ester of said acid and said alcohol; adding water to the boiling mixture so as to effect the removal from the mixture of the ester produced by the reaction while more ester is formed simultaneously, and adding to the mixture amounts of the said alcohol and acid which are chemically equivalent to the ester and alcohol removed from the mixture.

2. A process for producing esters of the class described, characterized by boiling a mixture containing: an organic carboxylic acid of the benzene series which is substantially non-volatile below 120° C., an aliphatic alcohol whose boiling point is below 100° C., water and the ester of said acid and said alcohol; continuously adding water to the boiling mixture so as to cause the ester produced by the reaction to be removed from the mixture in vapor phase, subjecting the escaping vapors to fractionation to effect the separation and recovery of the ester from the water contained in said vapor, and adding additional quantity of the said alcohol and acid to the mixture during the boiling operation.

3. A process for producing esters of the class described, characterized by boiling a mixture containing: an organic carboxylic acid which is substantially non-volatile below 120° C., an aliphatic alcohol whose boiling point is below 100° C., water, the ester of said alcohol, and a catalyst thereby continuously removing from said boiling mixture the ester produced by the reaction, and adding to said boiling mixture additional amounts of the said alcohol and acid which are chemically equivalent to the ester and the alcohol removed from the boiling mixture.

4. A process for producing esters of the class described, characterized by boiling a mixture containing: an organic carboxylic acid of the benzene series which is substantially non-volatile below 120° C., an aliphatic alcohol whose boiling point is below 100° C., water, the ester of said acid and said alcohol, and a catalyst, distilling the ester from the mixture, adding water to the boiling mixture so as to effect the removal from the mixture of the ester produced by the reaction while more ester is formed simultaneously, and replenishing the alcohol and acid in the mixture.

5. A process for producing esters of the class described, characterized by boiling a mixture containing: an organic carboxylic acid which is substantially non-volatile below 120° C., an aliphatic alcohol whose boiling point is below 100° C., water, and the ester of said acid and said alcohol; continuously adding water to the boiling mixture so as to cause the ester produced by the reaction to be removed from the mixture in vapor phase, subjecting the escaping vapors to fractionation to effect the separation and recovery of the ester from the water contained in said vapor, utilizing the water separated from the ester to constitute the source of supply of water which is added to the boiling mixture, and adding additional quantities of the said alcohol and acid to the boiling mixture simultaneously with the removal of the ester.

6. A process for producing esters of the class described, characterized by boiling a mixture containing: an organic carboxylic acid of the benzene series which is substantially non-volatile below 120° C., an aliphatic alcohol whose boiling point is below 100° C., water, and the ester of said acid and said alcohol; continuously adding water to said boiling mixture so as to cause the ester produced by the reaction to be removed from the mixture in vapor phase, subjecting the escaping vapors to fractionation to effect the separation of the alcohol from the ester and the water contained in said vapors, returning the alcohol to the boiling mixture, utilizing the water to constitute the source of supply of water that is added to the boiling mixture, and feeding into the boiling mixture amounts of the said acid and alcohol which are chemically equivalent to the ester recovered from the vapors which escape from the boiling mixture.

7. A method of producing esters of the class described, characterized by boiling a hydroxy-monocarboxylic acid of the benzene series which is substantially non-volatile below 120° C., an aliphatic alcohol whose boiling point is below 100° C., water and the ester of said alcohol and said acid; continuously adding water to said mixture during the operation of boiling the same, thereby causing the ester produced by the reaction to be carried off in the vapors evolved in the boiling operation, separating the ester from the alcohol vapors by fractionation, returning said recovered alcohol to the boiling mixture, separating and recovering the ester from the water, then using said water to constitute the source of supply of water that is added continuously to the boiling mixture, and adding additional quantities of said acid and alcohol to the mixture during the boiling operation.

8. A process for producing esters of the class described, characterized by boiling a mixture of alcohol, an organic carboxylic acid which is substantially non-volatile below 120° C., an aliphatic alcohol whose boiling point is below 100° C., water, and the ester of said alcohol and said acid, adding water to said boiling mixture continuously during the boiling operation so as to cause the ester produced by the reaction to be carried out of the chamber in which the mixture is being boiled, adding to said boiling mixture amounts of the said alcohol and acid which are chemically equivalent to the ester removed from the mixture, subjecting the vapors which escape from the boiling chamber to fractionation to separate them into an alcohol fraction and a water and ester fraction, returning the alcohol to the boiling chamber, subjecting the recovered water to distillation to remove from same any alcohol contained therein, and subsequently using said recovered water to constitute the source of supply of water that is added to the boiling mixture.

9. A method of producing methyl salicylate, characterized by boiling a mixture of methanol, methyl salicylate, salicylic acid and water, adding water to the boiling mixture so as to effect the removal of the methyl salicylate formed in the reaction, adding to the boiling mixture amounts of fresh salicylic acid and methanol chemically equivalent to the methyl salicylate which has been removed, fractionating the vapors evolved in the boiling operation, returning to the boiling mixture the methanol obtained in the fractionating operation, permitting the run-off of the fractionating operation to settle in order to separate the ester from the water, and utilizing a portion of such recovered water to constitute the source of supply of water that is added to the boiling mixture.

10. A method for producing methyl salicylate, characterized by boiling a mixture of methanol, methyl salicylate, salicylic acid, water, and a catalyst, adding water to the boiling mixture so as to effect the removal of the methyl salicylate formed in the reaction, adding to the boiling mixture amounts of fresh salicylic acid and methanol chemically equivalent to the methyl salicylate which has been removed, fractionating the vapors evolved in the boiling operation, returning to the boiling mixture the alcohol obtained in the fractionating operation, permitting the run-off of the fractionating operation to settle in order to separate the ester from the water, and utilizing a portion of said water to constitute the source of supply of water that is added to the boiling mixture.

THOMAS S. CARSWELL.
ERNEST T. STEHLBY.
NICOLAAS J. G. ALOZERIJ.